United States Patent Office.

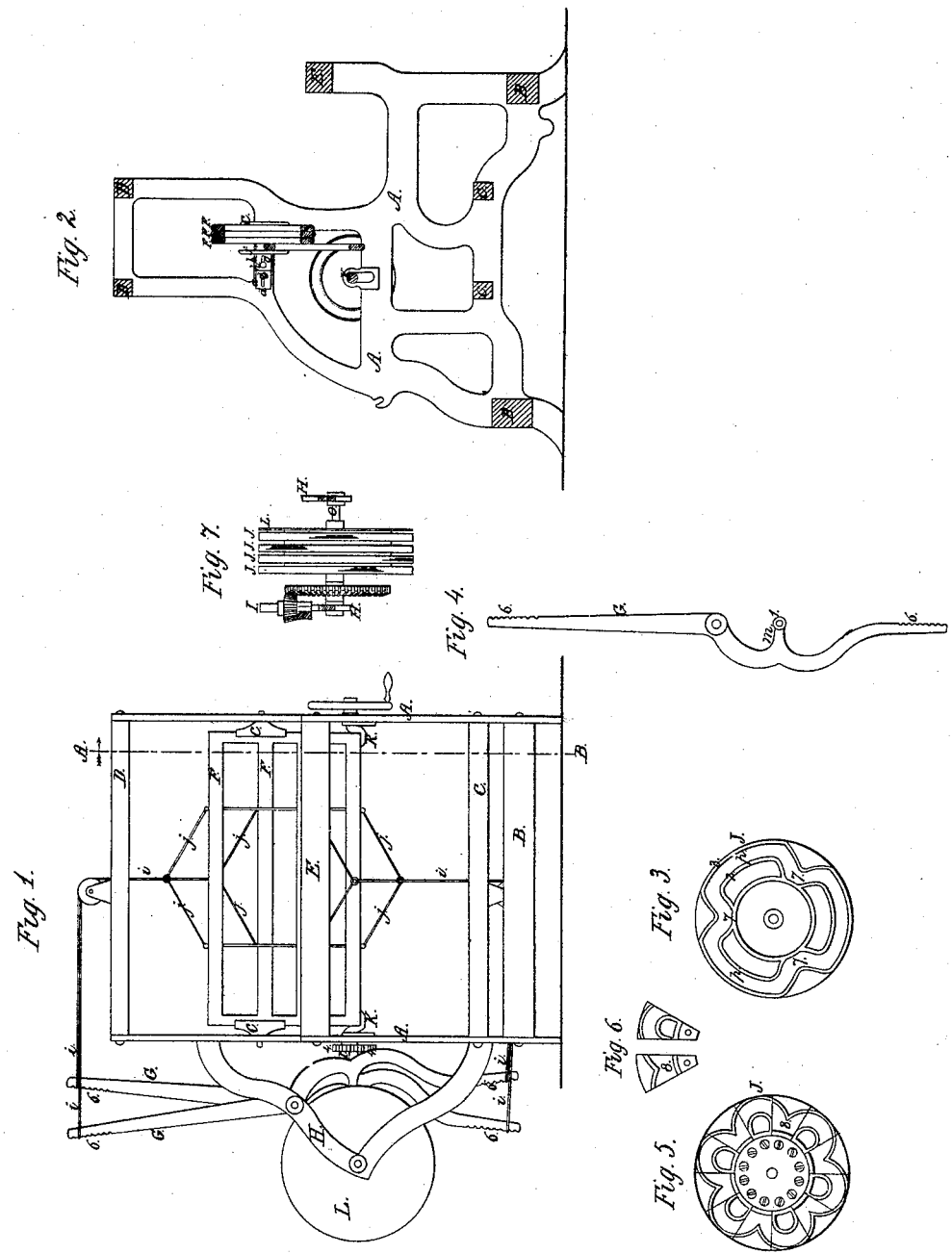

GEORGE CROMPTON, OF WORCESTER, MASSACHUSETTS.

Letters Patent No. 76,406, dated April 7, 1868.

IMPROVEMENT IN HARNESS-OPERATING MECHANISM FOR LOOMS.

The Schedule referred to in these Letters Patent and making part of the same.

KNOW ALL MEN BY THESE PRESENTS:

That I, GEORGE CROMPTON, of the city and county of Worcester, and Commonwealth of Massachusetts, have invented certain new and useful Improvements in Looms; and I do hereby declare that the following is a full, clear, and exact description of the same, reference being had to the accompanying drawings, forming a part of this specification, in which—

Figure 1 represents a front view of a loom with my improvements applied thereto, the loom being arranged, in this instance, for the use of four harnesses.

Figure 2 represents a cross-section on line A B.

Figure 3 represents a side view of the tappet-wheels used to give motion to the jacks.

Figure 4 represents a side view of a jack; and

Figures 5 and 6 represent side views of a modification of the tappet-wheel.

Figure 7, plan view of tappet-wheels.

In looms in which a greater or less number of harnesses are employed at different times, it is very important to have some simple and yet effective mode of adjusting the throw of the harnesses. By making the jacks with a series of notches, six at each end, as shown in the drawings, this adjustment can be made quickly and accurately, which, in connection with making the tappet-wheels as shown in fig. 5, renders my improved loom very desirable.

In the drawings, A A represent the sides of the frame, which I prefer to make of cast iron. B B are the two outer bottom cross-pieces to the frame, and C C are the two inner cross-pieces, and D D the two top cross-pieces. E is the front or cloth-beam. F F F F are the harness-frames, which work up and down between adjustable guide-pieces, a and b, fastened to each side of the main frame A of the loom, as fully shown in the drawings. The pieces a extend forward, and have lips, c, against which the front harness-frame works. The back ends of the pieces a are provided with slots, d, whereby they can be moved back and forward, to adjust them properly, after which they are held in place by turning up the screw or bolt e, which enters the side of the frame. The pieces b also have lips, f, and are provided with slots, g, whereby they can be moved back and forward, to admit of a greater or less number of harness-frames between the lips c and f. The pieces b are held in place by screws or bolts, h, which enter the pieces a.

The harness-frames are connected, at top and bottom, to cords or wires, i, in the usual manner, by inclined rods, wires, or cords, j, as indicated in the drawings. The cords or wires i of each harness-frame, both top and bottom, pass around rolls, and then extend to and are attached to an upright jack, G, each harness having its own jack, which acts independent of each of the others. The jacks G are of peculiar construction, as shown in the drawings, the centre part being curved, as shown, so as not to play between the tappet-wheels when in use, while motion is imparted to them from the tappet-wheels, acting upon the friction-rolls 1, turning on studs fast in the projecting arms m, (see fig. 4.) The jacks G are all supported and vibrate upon a common journal, n, which is supported by two pieces, H, one at each end of the journal, and being arranged and fastened to the sides of the loom-frame. Only one is shown in full in the drawings, the other being just opposite the one shown in fig. 1. The frame-pieces H also support another journal or shaft, o, upon which the tappet-wheels J are arranged, and so fastened as to turn with it. The tappet-wheels J are made with one side smooth or plain, and the other with a cam-groove, p, in which the friction-rolls on the arms m of the jacks G work. The inner flange, 2, is made to project beyond the flange 3, whereby there is sufficient space left between the flanges 3 and the backs of the tappet-wheels, for the easy play of the arms m of the jacks G. When the tappet-wheels are made whole, new or different wheels have to be used for each different pattern, but the wheels may be made in sections, as shown in figs. 5 and 6, whereby one or more sections may be taken off and others substituted, to form a different pattern.

Motion is imparted, in this instance, to shaft o, upon which all of the tappet-wheels J are fastened, by means of a gear, 4, upon the end of a shaft, I, which takes into and is turned by a small gear, 5, upon the end of crank-shaft K. Shaft I extends back, and has upon its outer end a bevel-wheel or gear, which meshes into a larger bevel-gear upon the shaft o, so that when the loom is in operation a positive motion is imparted to all of the tappet-wheels, and they, in turn, impart a positive motion to the jacks G, as before explained.

A face-plate, L, is fastened to the cam side of the last tappet-wheel, to keep out dust and dirt, and also to guard against the roll on the front jack springing from its place. I obtain a positive motion for the jacks when moved in either direction, and that, too, by the use of but one arm, *m*, and roll, 1, to each jack.

The ends of the jacks are notched, as seen at 6, whereby the cords or wires *i* can be moved, to give a greater or less throw to the harnesses, as may be desired. Preparatory to the throw of the shuttle and the beat of the lay, some one of the rolls 1 is caused to move into depressions, 7, of the groove *p*. Any desired number of tappet-wheels may be used at any one time.

The jacks G might be arranged to work upon the opposite side of shaft *o*, but I prefer to use them as shown in the drawings, since the loom, when they are thus arranged, occupies much less space than it would if the tappet-wheels were arranged between the jacks and the side of the loom. The blank pieces, 8, in the tappet-wheel, shown in fig. 5, may be so made as to bring or hold the harnesses upon the same plane at the beat of the lay. The use of a half cam would effect this.

In fig. 7 is shown a plan view of the tappet-wheels J, when arranged upon shaft *o*, as shown in fig. 1.

Having described my improved loom, what I claim as my invention, and desire to secure by Letters Patent, is—

The combination and arrangement, in a loom for weaving fancy or other goods, of a series of cams, when made as shown in fig. 5 of the drawings, with a series of jacks, G, having a series of notches, 6, substantially as and for the purposes set forth.

GEO. CROMPTON.

Witnesses:
 THOS. H. DODGE,
 J. HENRY HILL.